(12) United States Patent
Bortolin et al.

(10) Patent No.: US 8,407,083 B2
(45) Date of Patent: Mar. 26, 2013

(54) METHOD AND SYSTEM FOR MANAGING REWARD REVERSAL AFTER POSTING

(75) Inventors: Corinne Bortolin, Half Moon Bay, CA (US); Ayman Hammad, Pleasanton, CA (US)

(73) Assignee: Visa U.S.A., Inc., San Francisco, CA (US)

( * ) Notice: Subject to any disclaimer, the term of this patent is extended or adjusted under 35 U.S.C. 154(b) by 1456 days.

(21) Appl. No.: 10/678,030

(22) Filed: Sep. 30, 2003

(65) Prior Publication Data

US 2005/0071228 A1    Mar. 31, 2005

(51) Int. Cl.
*G06Q 30/00* (2012.01)
(52) U.S. Cl. ....................................... 705/14.1
(58) Field of Classification Search ............. 705/14, 705/14.1
See application file for complete search history.

(56) References Cited

U.S. PATENT DOCUMENTS

| | | |
|---|---|---|
| 3,935,933 A | 2/1976 | Tanaka et al. |
| 4,011,433 A | 3/1977 | Tateisi et al. |
| 4,108,350 A | 8/1978 | Forbes, Jr. |
| 4,124,109 A | 11/1978 | Bissell et al. |
| 4,195,864 A | 4/1980 | Morton et al. |
| 4,412,631 A | 11/1983 | Haker |
| 4,544,590 A | 10/1985 | Egan |
| 4,568,403 A | 2/1986 | Egan |
| 4,674,041 A | 6/1987 | Lemon et al. |
| 4,723,212 A | 2/1988 | Mindrum et al. |
| 4,742,215 A | 5/1988 | Daughters et al. |
| 4,794,530 A | 12/1988 | Yukiura et al. |
| 4,825,053 A | 4/1989 | Caille |
| 4,837,422 A | 6/1989 | Dethloff et al. |
| 4,841,712 A | 6/1989 | Roou |
| 4,868,376 A | 9/1989 | Lessin et al. |
| 4,882,675 A | 11/1989 | Nichtberger et al. |
| 4,910,672 A | 3/1990 | Off et al. |
| 4,930,129 A | 5/1990 | Takahira |
| 4,941,090 A | 7/1990 | McCarthy |
| 4,949,256 A | 8/1990 | Humble |
| 4,954,003 A | 9/1990 | Shea |
| 4,985,615 A | 1/1991 | Iijima |
| 4,992,940 A | 2/1991 | Dworkin |
| 5,019,452 A | 5/1991 | Watanabe et al. |
| 5,019,695 A | 5/1991 | Itako |
| 5,025,372 A | 6/1991 | Burton et al. |
| 5,056,019 A | 10/1991 | Schultz et al. |
| 5,060,793 A | 10/1991 | Hyun et al. |
| 5,060,804 A | 10/1991 | Beales et al. |

(Continued)

FOREIGN PATENT DOCUMENTS

| | | |
|---|---|---|
| AU | 200039412 A1 | 12/2000 |
| BE | 1002756 A6 | 5/1991 |

(Continued)

OTHER PUBLICATIONS

"Internet based secure transactions using encrypting applets and cgi-scripts Independent of browser or server capabilities"; 1998, *IBM Research Disclosure*, No. 410116, pp. 800-801.

*Primary Examiner* — Daniel Lastra
(74) *Attorney, Agent, or Firm* — Kilpatrick Townsend & Stockton LLP

(57) ABSTRACT

A system for managing reward reversal is provided. The system includes a device that is capable of adjusting the accumulation and redemption levels of rewards after a purchase or return transaction.

30 Claims, 11 Drawing Sheets

U.S. PATENT DOCUMENTS

| | | | |
|---|---|---|---|
| 5,063,596 A | 11/1991 | Dyke |
| 5,115,888 A | 5/1992 | Schneider |
| 5,117,355 A | 5/1992 | McCarthy |
| 5,128,752 A | 7/1992 | Von Kohorn |
| 5,161,256 A | 11/1992 | Iijima |
| 5,173,851 A | 12/1992 | Off et al. |
| 5,185,695 A | 2/1993 | Pruchnicki |
| 5,200,889 A | 4/1993 | Mori |
| 5,202,826 A | 4/1993 | McCarthy |
| 5,227,874 A | 7/1993 | Von Kohorn |
| 5,256,863 A | 10/1993 | Ferguson et al. |
| 5,285,278 A | 2/1994 | Holman |
| 5,287,181 A | 2/1994 | Holman |
| 5,287,268 A | 2/1994 | McCarthy |
| 5,299,834 A | 4/1994 | Kraige |
| 5,308,120 A | 5/1994 | Thompson |
| 5,353,218 A | 10/1994 | De Lapa et al. |
| 5,380,991 A | 1/1995 | Valencia et al. |
| RE34,915 E | 4/1995 | Nichtberger et al. |
| 5,402,549 A | 4/1995 | Forrest |
| 5,417,458 A | 5/1995 | Best et al. |
| 5,420,606 A | 5/1995 | Begum et al. |
| 5,450,938 A | 9/1995 | Rademacher |
| 5,466,010 A | 11/1995 | Spooner |
| 5,471,669 A | 11/1995 | Lidman |
| 5,473,690 A | 12/1995 | Grimonprez et al. |
| 5,483,444 A | 1/1996 | Heintzeman et al. |
| 5,484,998 A | 1/1996 | Bejnar et al. |
| 5,491,326 A | 2/1996 | Marceau et al. |
| 5,491,838 A | 2/1996 | Takahisa et al. |
| 5,500,681 A | 3/1996 | Jones |
| 5,501,491 A | 3/1996 | Thompson |
| 5,513,102 A | 4/1996 | Auriemma |
| 5,515,270 A | 5/1996 | Weinblatt |
| 5,530,232 A | 6/1996 | Taylor |
| 5,531,482 A | 7/1996 | Blank |
| 5,535,118 A | 7/1996 | Chumbley |
| 5,537,314 A | 7/1996 | Kanter |
| 5,559,313 A | 9/1996 | Claus et al. |
| 5,564,073 A | 10/1996 | Takahisa |
| 5,577,266 A | 11/1996 | Takahisa et al. |
| 5,577,915 A | 11/1996 | Feldman |
| 5,578,808 A | 11/1996 | Taylor |
| 5,579,537 A | 11/1996 | Takahisa |
| 5,594,493 A | 1/1997 | Nemirofsky |
| 5,612,868 A | 3/1997 | Off et al. |
| 5,621,812 A | 4/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,649,118 A | 7/1997 | Carlisle et al. |
| 5,650,209 A | 7/1997 | Ramsburg et al. |
| 5,687,322 A | 11/1997 | Deaton et al. |
| 5,689,100 A | 11/1997 | Carrithers et al. |
| 5,710,886 A | 1/1998 | Christensen et al. |
| 5,727,153 A | 3/1998 | Powell |
| 5,734,838 A | 3/1998 | Robinson et al. |
| 5,742,845 A | 4/1998 | Wagner |
| 5,754,762 A | 5/1998 | Kuo et al. |
| 5,761,648 A | 6/1998 | Golden et al. |
| 5,765,141 A | 6/1998 | Spector |
| 5,767,896 A | 6/1998 | Nemirofsky |
| 5,774,870 A | 6/1998 | Storey |
| 5,776,287 A | 7/1998 | Best et al. |
| 5,791,991 A | 8/1998 | Small |
| 5,794,210 A | 8/1998 | Goldhaber et al. |
| 5,797,126 A | 8/1998 | Helbling et al. |
| 5,802,519 A | 9/1998 | De Jong |
| 5,804,806 A | 9/1998 | Haddad et al. |
| 5,806,044 A | 9/1998 | Powell |
| 5,806,045 A | 9/1998 | Biorge et al. |
| 5,815,658 A | 9/1998 | Kuriyama |
| 5,822,735 A | 10/1998 | De Lapa et al. |
| 5,822,737 A | 10/1998 | Ogram |
| 5,832,457 A | 11/1998 | O'Brien et al. |
| 5,844,218 A | 12/1998 | Kawan et al. |
| 5,845,259 A | 12/1998 | West et al. |
| 5,855,007 A | 12/1998 | Jovicic et al. |
| 5,857,175 A | 1/1999 | Day et al. |
| 5,859,419 A | 1/1999 | Wynn |
| RE36,116 E | 2/1999 | McCarthy |
| 5,865,340 A | 2/1999 | Alvern |
| 5,865,470 A | 2/1999 | Thompson |
| 5,868,498 A | 2/1999 | Martin |
| 5,880,769 A | 3/1999 | Nemirofsky et al. |
| 5,884,271 A | 3/1999 | Pitroda |
| 5,884,277 A | 3/1999 | Khosla |
| 5,884,278 A | 3/1999 | Powell |
| 5,887,271 A | 3/1999 | Powell |
| 5,890,135 A | 3/1999 | Powell |
| 5,892,827 A | 4/1999 | Beach et al. |
| 5,898,838 A | 4/1999 | Wagner |
| 5,903,732 A | 5/1999 | Reed et al. |
| 5,905,246 A | 5/1999 | Fajkowski |
| 5,905,908 A | 5/1999 | Wagner |
| 5,907,350 A | 5/1999 | Nemirofsky |
| 5,907,830 A | 5/1999 | Engel et al. |
| 5,909,486 A | 6/1999 | Walker et al. |
| 5,912,453 A | 6/1999 | Gungl et al. |
| 5,915,244 A | 6/1999 | Jack et al. |
| 5,923,016 A * | 7/1999 | Fredregill et al. ............ 235/380 |
| 5,923,884 A | 7/1999 | Peyret et al. |
| 5,924,072 A | 7/1999 | Havens |
| 5,926,795 A | 7/1999 | Williams |
| 5,928,082 A | 7/1999 | Clapper, Jr. |
| 5,931,947 A | 8/1999 | Burns et al. |
| 5,943,651 A | 8/1999 | Oosawa |
| 5,950,173 A | 9/1999 | Perkowski |
| 5,953,047 A | 9/1999 | Nemirofsky |
| 5,953,705 A | 9/1999 | Oneda |
| 5,956,694 A | 9/1999 | Powell |
| 5,956,695 A | 9/1999 | Carrithers et al. |
| 5,958,174 A | 9/1999 | Ramsberg et al. |
| 5,960,082 A | 9/1999 | Haenel |
| 5,963,917 A | 10/1999 | Ogram |
| 5,969,318 A | 10/1999 | Mackenthun |
| 5,970,469 A | 10/1999 | Scroggie et al. |
| 5,974,399 A | 10/1999 | Giuliani et al. |
| 5,974,549 A | 10/1999 | Golan |
| 5,978,013 A | 11/1999 | Jones et al. |
| 5,987,795 A | 11/1999 | Wilson |
| 5,997,042 A | 12/1999 | Blank |
| 6,000,608 A | 12/1999 | Dorf |
| 6,002,771 A | 12/1999 | Nielsen |
| 6,003,113 A | 12/1999 | Hoshino |
| 6,003,134 A | 12/1999 | Kuo et al. |
| 6,005,942 A | 12/1999 | Chan et al. |
| 6,009,411 A | 12/1999 | Kepecs |
| 6,012,635 A | 1/2000 | Shimada et al. |
| 6,014,634 A | 1/2000 | Scroggie et al. |
| 6,024,286 A | 2/2000 | Bradley et al. |
| 6,035,280 A | 3/2000 | Christensen |
| 6,038,551 A | 3/2000 | Barlow et al. |
| 6,041,309 A | 3/2000 | Laor |
| 6,047,325 A | 4/2000 | Jain et al. |
| 6,049,778 A | 4/2000 | Walker et al. |
| 6,052,468 A | 4/2000 | Hillhouse |
| 6,052,690 A | 4/2000 | de Jong |
| 6,052,785 A | 4/2000 | Lin et al. |
| 6,055,509 A | 4/2000 | Powell |
| 6,061,660 A | 5/2000 | Eggleston et al. |
| 6,067,526 A | 5/2000 | Powell |
| 6,070,147 A | 5/2000 | Harms et al. |
| 6,073,238 A | 6/2000 | Drupsteen |
| 6,076,068 A | 6/2000 | DeLapa et al. |
| 6,076,069 A | 6/2000 | Laor |
| 6,089,611 A | 7/2000 | Blank |
| 6,094,656 A | 7/2000 | De Jong |
| 6,101,422 A | 8/2000 | Furlong |
| 6,101,477 A | 8/2000 | Hohle et al. |
| 6,105,002 A | 8/2000 | Powell |
| 6,105,865 A | 8/2000 | Hardesty |
| 6,105,873 A | 8/2000 | Jeger |
| 6,112,987 A | 9/2000 | Lambert et al. |
| 6,112,988 A | 9/2000 | Powell |
| 6,119,933 A | 9/2000 | Wong et al. |
| 6,119,945 A | 9/2000 | Muller et al. |

| | | | |
|---|---|---|---|
| 6,122,631 A | 9/2000 | Berbec et al. | |
| 6,129,274 A | 10/2000 | Suzuki | |
| 6,144,948 A | 11/2000 | Walker et al. | |
| 6,151,586 A | 11/2000 | Brown | |
| 6,151,587 A | 11/2000 | Matthias | |
| 6,154,751 A | 11/2000 | Ault et al. | |
| 6,161,870 A | 12/2000 | Blank | |
| 6,164,549 A | 12/2000 | Richards | |
| 6,170,061 B1 | 1/2001 | Beser | |
| 6,173,269 B1 | 1/2001 | Solokl et al. | |
| 6,173,891 B1 | 1/2001 | Powell | |
| 6,179,205 B1 | 1/2001 | Sloan | |
| 6,179,710 B1 | 1/2001 | Sawyer et al. | |
| 6,183,017 B1 | 2/2001 | Najor et al. | |
| 6,185,541 B1 | 2/2001 | Scroggie et al. | |
| 6,189,100 B1 | 2/2001 | Barr et al. | |
| 6,189,878 B1 | 2/2001 | Meese | |
| 6,195,666 B1 | 2/2001 | Schneck et al. | |
| 6,210,276 B1 | 4/2001 | Mullins | |
| 6,216,014 B1 | 4/2001 | Proust et al. | |
| 6,216,204 B1 | 4/2001 | Thiriet | |
| 6,220,510 B1 | 4/2001 | Everett et al. | |
| 6,222,914 B1 | 4/2001 | McMullin | |
| 6,230,143 B1 | 5/2001 | Simons et al. | |
| 6,237,145 B1 | 5/2001 | Narasimhan et al. | |
| 6,241,287 B1 | 6/2001 | Best et al. | |
| 6,243,687 B1 | 6/2001 | Powell | |
| 6,243,688 B1 | 6/2001 | Kalina | |
| 6,244,958 B1 | 6/2001 | Acres | |
| 6,266,647 B1 | 7/2001 | Fernandez | |
| 6,267,263 B1 | 7/2001 | Emoff et al. | |
| 6,269,158 B1 | 7/2001 | Kim | |
| 6,279,112 B1 | 8/2001 | O'Toole, Jr. et al. | |
| 6,282,516 B1 | 8/2001 | Giuliani | |
| 6,292,785 B1 | 9/2001 | McEvoy et al. | |
| 6,292,786 B1 | 9/2001 | Deaton et al. | |
| 6,296,191 B1 | 10/2001 | Hamann et al. | |
| 6,299,530 B1 | 10/2001 | Hansted et al. | |
| 6,321,208 B1 | 11/2001 | Barnett et al. | |
| 6,385,723 B1 | 5/2002 | Richards | |
| 6,390,374 B1 | 5/2002 | Carper et al. | |
| 6,480,935 B1 | 11/2002 | Carper et al. | |
| 6,549,773 B1 | 4/2003 | Linden et al. | |
| 6,549,912 B1 | 4/2003 | Chen | |
| 6,612,490 B1 | 9/2003 | Herrendoerfer et al. | |
| 6,681,995 B2 | 1/2004 | Sukeda et al. | |
| 6,689,345 B2 | 2/2004 | Jager Lezer | |
| 6,932,270 B1* | 8/2005 | Fajkowski | 235/383 |
| 7,461,022 B1* | 12/2008 | Churchill et al. | 705/37 |
| 2001/0054003 A1* | 12/2001 | Chien et al. | 705/14 |
| 2002/0002468 A1 | 1/2002 | Spagna et al. | |
| 2002/0026348 A1* | 2/2002 | Fowler et al. | 705/10 |
| 2002/0069169 A1* | 6/2002 | Sukeda et al. | 705/41 |
| 2002/0076051 A1 | 6/2002 | Nii | |
| 2002/0107738 A1* | 8/2002 | Beach et al. | 705/14 |
| 2004/0122736 A1 | 6/2004 | Strock | |
| 2006/0259364 A1* | 11/2006 | Strock et al. | 705/14 |

FOREIGN PATENT DOCUMENTS

| | | |
|---|---|---|
| CA | 2293944 | 8/2000 |
| CA | 2267041 | 9/2000 |
| CA | 2317138 A1 | 1/2002 |
| DE | 19522527 A1 | 1/1997 |
| DE | 19848712 A1 | 4/2000 |
| DE | 19960978 A1 | 8/2000 |
| DE | 10015103 A1 | 10/2000 |
| EP | 0203424 A2 | 12/1986 |
| EP | 0292248 A2 | 11/1988 |
| EP | 0475837 A1 | 3/1992 |
| EP | 0540095 A1 | 5/1993 |
| EP | 0658862 A2 | 6/1995 |
| EP | 0675614 A1 | 10/1995 |
| EP | 0682327 A2 | 11/1995 |
| EP | 0875841 A2 | 11/1998 |
| EP | 0936530 A1 | 8/1999 |
| EP | 0938050 A2 | 8/1999 |
| EP | 0938051 A2 | 8/1999 |
| EP | 0944007 A2 | 9/1999 |
| EP | 0949595 A2 | 10/1999 |
| EP | 0982692 A2 | 3/2000 |
| EP | 0984404 A2 | 3/2000 |
| EP | 1085395 A2 | 3/2001 |
| EP | 1102320 A1 | 5/2001 |
| EP | 1111505 A1 | 6/2001 |
| EP | 1113387 A2 | 7/2001 |
| EP | 1113407 A2 | 7/2001 |
| EP | 1168137 A1 | 1/2002 |
| EP | 1233333 A1 | 8/2002 |
| FR | 2772957 A1 | 6/1999 |
| FR | 2793048 A1 | 11/2000 |
| FR | 2794543 A1 | 12/2000 |
| FR | 2796176 A1 | 1/2001 |
| FR | 2804234 A1 | 7/2001 |
| GB | 2331381 A | 5/1999 |
| GB | 2343091 A | 4/2000 |
| GB | 2351379 A | 12/2000 |
| GB | 2355324 A | 4/2001 |
| JP | 2000-112864 A | 4/2000 |
| JP | 2000-181764 A | 6/2000 |
| JP | 2001-202484 A | 7/2001 |
| JP | 2001-236232 A | 8/2001 |
| KR | 0039297 A | 5/2001 |
| KR | 0044823 A | 6/2001 |
| KR | 0058742 A | 7/2001 |
| KR | 0021237 A | 3/2002 |
| WO | WO 90/16126 A1 | 12/1990 |
| WO | WO 96/25724 A1 | 8/1996 |
| WO | WO 96/38945 A1 | 12/1996 |
| WO | WO 96/42109 A1 | 12/1996 |
| WO | WO 97/05582 A1 | 2/1997 |
| WO | WO 97/10562 A1 | 3/1997 |
| WO | WO 97/39424 A1 | 10/1997 |
| WO | WO 98/02834 A1 | 1/1998 |
| WO | WO 98/09257 A1 | 3/1998 |
| WO | WO 98/20465 A1 | 5/1998 |
| WO | WO 98/43169 A2 | 10/1998 |
| WO | WO 98/43212 A1 | 10/1998 |
| WO | WO 98/52153 A2 | 11/1998 |
| WO | WO 99/10824 A1 | 3/1999 |
| WO | WO 99/16030 A1 | 4/1999 |
| WO | WO 99/19846 A2 | 4/1999 |
| WO | WO 99/44172 A1 | 9/1999 |
| WO | WO 99/45507 A1 | 9/1999 |
| WO | WO 99/49415 A2 | 9/1999 |
| WO | WO 99/49426 A1 | 9/1999 |
| WO | WO 00/39714 A1 | 7/2000 |
| WO | WO 00/46665 A2 | 8/2000 |
| WO | WO 00/54507 A1 | 9/2000 |
| WO | WO 00/57315 A2 | 9/2000 |
| WO | WO 00/57613 A1 | 9/2000 |
| WO | WO 00/62265 A1 | 10/2000 |
| WO | WO 00/62472 A1 | 10/2000 |
| WO | WO 00/67185 A1 | 11/2000 |
| WO | WO 00/68797 A1 | 11/2000 |
| WO | WO 00/68902 A1 | 11/2000 |
| WO | WO 00/68903 A1 | 11/2000 |
| WO | WO 00/69183 A2 | 11/2000 |
| WO | WO 00/75775 A2 | 12/2000 |
| WO | WO 00/77750 A1 | 12/2000 |
| WO | WO 01/04851 A1 | 1/2001 |
| WO | WO 01/06341 A1 | 1/2001 |
| WO | WO 01/08087 A1 | 2/2001 |
| WO | WO 01/13572 A1 | 2/2001 |
| WO | WO 01/15397 A1 | 3/2001 |
| WO | WO 01/18633 A1 | 3/2001 |
| WO | WO 01/18746 A1 | 3/2001 |
| WO | WO 01/29672 A1 | 4/2001 |
| WO | WO 01/33390 A2 | 5/2001 |
| WO | WO 01/40908 A2 | 6/2001 |
| WO | WO 01/42887 A2 | 6/2001 |
| WO | WO 01/44900 A2 | 6/2001 |
| WO | WO 01/44949 A2 | 6/2001 |
| WO | WO 01/47176 A1 | 6/2001 |
| WO | WO 01/50229 A2 | 7/2001 |
| WO | WO 01/52575 A1 | 7/2001 |
| WO | WO 01/55955 A1 | 8/2001 |
| WO | WO 01/59563 A1 | 8/2001 |
| WO | WO 01/61620 A1 | 8/2001 |

| | | | |
|---|---|---|---|
| WO | WO 01/65545 A2 | 9/2001 |
| WO | WO 01/67694 A1 | 9/2001 |
| WO | WO 01/71648 A2 | 9/2001 |
| WO | WO 01/71679 A2 | 9/2001 |
| WO | WO 01/73530 A2 | 10/2001 |
| WO | WO 01/73533 A1 | 10/2001 |
| WO | WO 01/78020 A1 | 10/2001 |
| WO | WO 01/80563 A1 | 10/2001 |
| WO | WO 01/84377 A2 | 11/2001 |
| WO | WO 01/84474 A2 | 11/2001 |
| WO | WO 01/84512 A1 | 11/2001 |
| WO | WO 01/88705 A1 | 11/2001 |
| WO | WO 02/06948 A1 | 1/2002 |
| WO | WO 02/10962 A1 | 2/2002 |
| WO | WO 02/14991 A2 | 2/2002 |
| WO | WO 02/15037 A1 | 2/2002 |
| WO | WO 02/21315 A1 | 3/2002 |
| WO | WO 02/29577 A2 | 4/2002 |
| WO | WO 02/088895 A2 | 11/2002 |

* cited by examiner

METHOD AND SYSTEM FOR MANAGING REWARD REVERSAL AFTER POSTING

BACKGROUND OF THE INVENTION

The present invention generally relates to management of reward redemptions in a loyalty program and, more specifically, to a method and system for facilitating reinstatement of redeemed rewards and accruals in the event that a qualifying transaction is reversed.

Loyalty programs are programs that provide participants with incentives to shop at certain retailers sponsoring the program. An incentive is something of value that may be redeemed or collected by a participant. Retailers may thus provide automatic rewards for redemption at the point of sale to customers making a purchase that qualifies for redemption. Alternatively, retailers sponsoring a loyalty program may allow a customer to accumulate or collect incentives, points or credits which entitle the customer to receive redeemable rewards.

Conventional approaches for handling reward accruals and redemptions have a number of problems. One problem is, for example, after a customer redeems a reward, the reward cannot be reinstated to the customer for future redemption if the customer subsequently reverses a qualifying transaction. In other words, once redeemed, the reward is irreversibly used. To qualify for the same reward, the customer will then have to start all over again by making additional qualifying purchases. Consequently, customer's satisfaction may be greatly reduced due to the inability to reinstate and redeem previously-earned rewards and the need to requalify for the same reward.

Another problem is fraudulent reward accruals. Under conventional approaches, when a customer reverses a qualifying transaction, any reward earned or accrued, in whole or in part, is not similarly reversed. As a result, a customer is able to accumulate and redeem rewards that s/he is not entitled to. This encourages fraudulent behavior by customers who make qualifying purchases only to reverse them later on for the sole purpose of accruing rewards.

Therefore, it is desirable to provide a method and system that facilitates the reversal of reward redemptions and accruals in order to enhance customer satisfaction and minimize fraudulent abuse of a loyalty program when qualifying transactions are reversed.

BRIEF SUMMARY OF THE INVENTION

A system for managing reward reversal is provided. The system includes a device that is capable of adjusting the accumulation and redemption levels of rewards after a purchase or return transaction.

In one exemplary embodiment, a system for managing reward reversals in connection with a loyalty program comprises: control logic configured to receive information relating to a previously completed transaction that is to be reversed, the previously completed transaction being associated with an account linked to the loyalty program; control logic configured to determine reversal information for the transaction to be reversed; and control logic configured to use the reversal information to reverse the previously completed transaction and update the associated account.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

Figure 1:
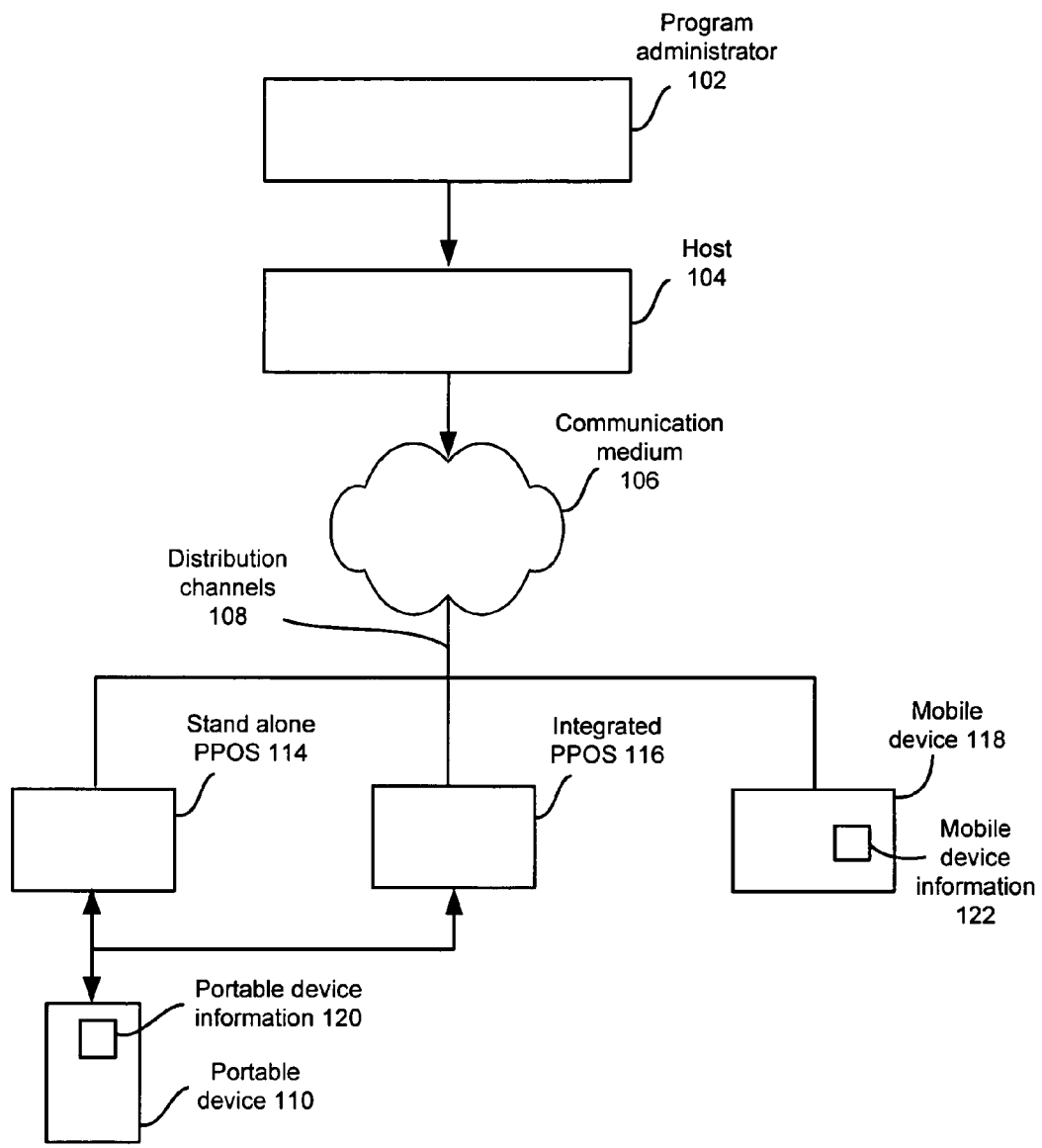
FIG. 1 is a simplified block diagram illustrating a system in accordance with an exemplary embodiment of the present invention.

The present invention in the form of one or more exemplary embodiments will now be described. FIG. 1 is a simplified block diagram illustrating a system 100 in accordance with an exemplary embodiment of the present invention. The system 100 includes a program administrator 102, a host 104, a communication medium 106, a number of distribution channels 108, a number of acceptance point devices including a stand-alone physical point-of-sale (PPOS) device 114, an integrated PPOS device 116 and a mobile device 118, and a number of portable devices 110.

The host 104 stores and controls information relating to the loyalty programs. Sponsors typically define the corresponding parameters of the loyalty programs and, in one embodiment, provide such parameters to the host 104 via the program administrator 102. The host 104 may include different rules for individual loyalty programs that each sponsor or participating retailer adopts. The loyalty program parameters define the rules of each program, such as start dates, end dates, customer eligibility, product eligibility, etc. In one implementation, the host 104 is a computer server having a number of software applications that manage various loyalty programs.

The host 104 is configured to interact with program participants through the acceptance point devices, such as, the stand-alone PPOS device 114, the integrated PPOS device 116 and the mobile device 118. The host 104 communicates with the acceptance point devices via the communication medium 106 and the distribution channels 108. The communication medium 106 may be any kind of communication network, including but not limited to the Internet, a local area network (LAN), a wide area network (WAN), and a wireless network, etc.

In one implementation, the acceptance point device is a point-of-sale (POS) device. The POS device may be a stand-alone PPOS device dedicated solely to performing point-of-sale transactions, or devices integrated into other devices. Examples of stand-alone PPOS devices 114 are point-of-sale devices in merchants' stores, such as cash registers. Examples of integrated PPOS devices 116 are applications on the Internet that may be accessed through computing devices. POS devices may also be mobile devices 118 including, for example, laptop computers, pocket personal computers, cellular phones and personal digital assistants. Other examples of acceptance point devices include but are not limited to computer terminals, electronic cash registers, automated teller machines, virtual cash registers, kiosks, and security systems.

In one embodiment, the acceptance point device is coupled to a corresponding merchant system (not shown) to allow other merchant functions to be performed in conjunction with the acceptance point device. In alternative embodiments, the acceptance point device may be coupled to other types of devices. Furthermore, it should be understood that, in other embodiments, the acceptance point device may be integrated with the merchant system.

The connection between the acceptance point device and the portable device 110 may be cable, electronic, magnetic, wireless, etc.

The acceptance point device also includes a control application. The control application provides the logic for managing the loyalty programs including, for example, managing the reward reversal calculations and the adjustments of redemption or accrual levels in a loyalty program. The control application may be implemented by software or hardware or a combination of both. In one embodiment, the control application operates online in real time. In another embodiment, the control application operates offline where information is periodically transmitted from the acceptance point device to the host 104 through the communication medium 106.

As will be further described below, the control application is used to manage one or more loyalty programs. For example, the control application is capable of adding to or reversing the amount of accumulated rewards and the amount of redeemed rewards after a transaction. The amount of accumulated rewards may be represented by an accumulation level, and the amount of redeemed rewards may be represented by a redemption level. The accumulation and redemption levels may be in the form of, for example, the number of qualifying products in a given transaction, or the total dollar value of a given transaction. In exemplary embodiments, the accumulation and redemption levels are stored in the portable device 110.

During a purchase transaction that qualifies for a reward, the control application may increase the value of the accumulation level in the portable device 110. During a return (or reversal) transaction that involves an accumulated and/or redeemed reward, the control application may adjust the accumulation level and/or the redemption level. For example, in a return transaction, a previously earned reward may be backed out and a previously redeemed reward may be reinstated.

If the reward stored in the portable device 110 qualifies for redemption, the control application may grant the reward and subsequently reset the accumulation level to zero. Resetting the accumulation level to zero ensures that a loyalty program participant makes the required number of qualifying purchases to earn another reward.

In one embodiment, if the reward stored in the portable device 110 is disqualified from redemption after a return, the control application may reinstate the reward and adjust the accumulation level; in another embodiment, the accumulation level is reset to zero and an escrow account is established. The escrow account is generally a negative balance that requires clearing before another reward may be earned. Different operations of the control application will be further described in the examples provided below.

The portable device 110 includes one or more applications including those that relate to corresponding loyalty programs. These applications may further include transactional information and information that is specific to the loyalty program participants. Examples of such information include the history of a customer's purchase transactions, such as the amount of accumulated and redeemed rewards, and information regarding a redemption limit of rewards.

The portable device 110 can be of many suitable forms, such as credit or debit cards, smart cards, cellular phones, personal digital assistants, pagers, payment cards, security cards, acceptance cards, smart media and transponders. The smart card is one exemplary embodiment that includes a microprocessor embedded within or on a planar plastic body, and electrically connected to contacts on the exterior of the smart card. The smart card may include any suitable medium storing data that is readable to a computer, including but not limited to a ROM (read only memory), RAM (random access memory) and EEPROM (programmable read only memory).

Figure 5:
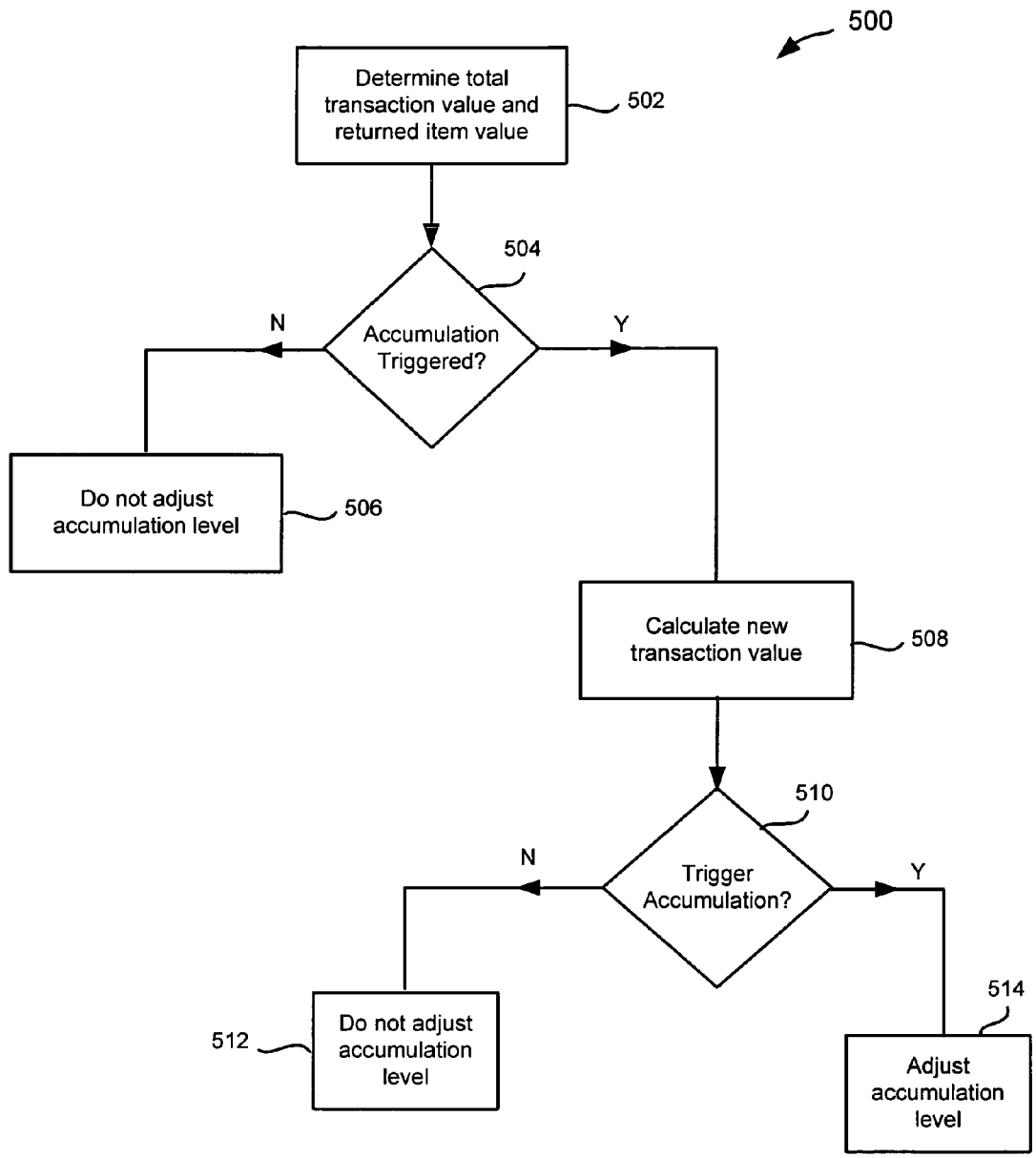

The logic of the reversal process that is initiated when an item is returned is illustrated in FIG. 5. When performing a return, two values are entered (502) including the total value of the item being returned and the total value of the transaction which included the item being returned. At 504, it is then determined whether the total value of the transaction exceeds the trigger for accumulation (e.g., $50). At 506, if accumulation is not triggered, the accumulation level is not adjusted and the value of the accumulation level remains the same as before the return transaction.

At 508, if accumulation is triggered, the difference between the value of the returned item and the total value of the transaction is calculated. This difference represents the new total value of the transaction which is the original total value of the transaction less the value of the returned item. At 510, the difference or the new total value of the transaction is then used to determine if the trigger for accumulation is exceeded after the return, i.e., whether the original transaction less the returned item is still entitled to accumulation. At 512, if accumulation is not triggered, the accumulation level is not adjusted. At 514, if accumulation is triggered, the accumulation level is adjusted. In one implementation, the accumulation level is adjusted by subtracting the new total value of the transaction from the original total value of the transaction and adding the difference to the accumulation level. It should be noted that the difference may be a negative number.

Figure 2:
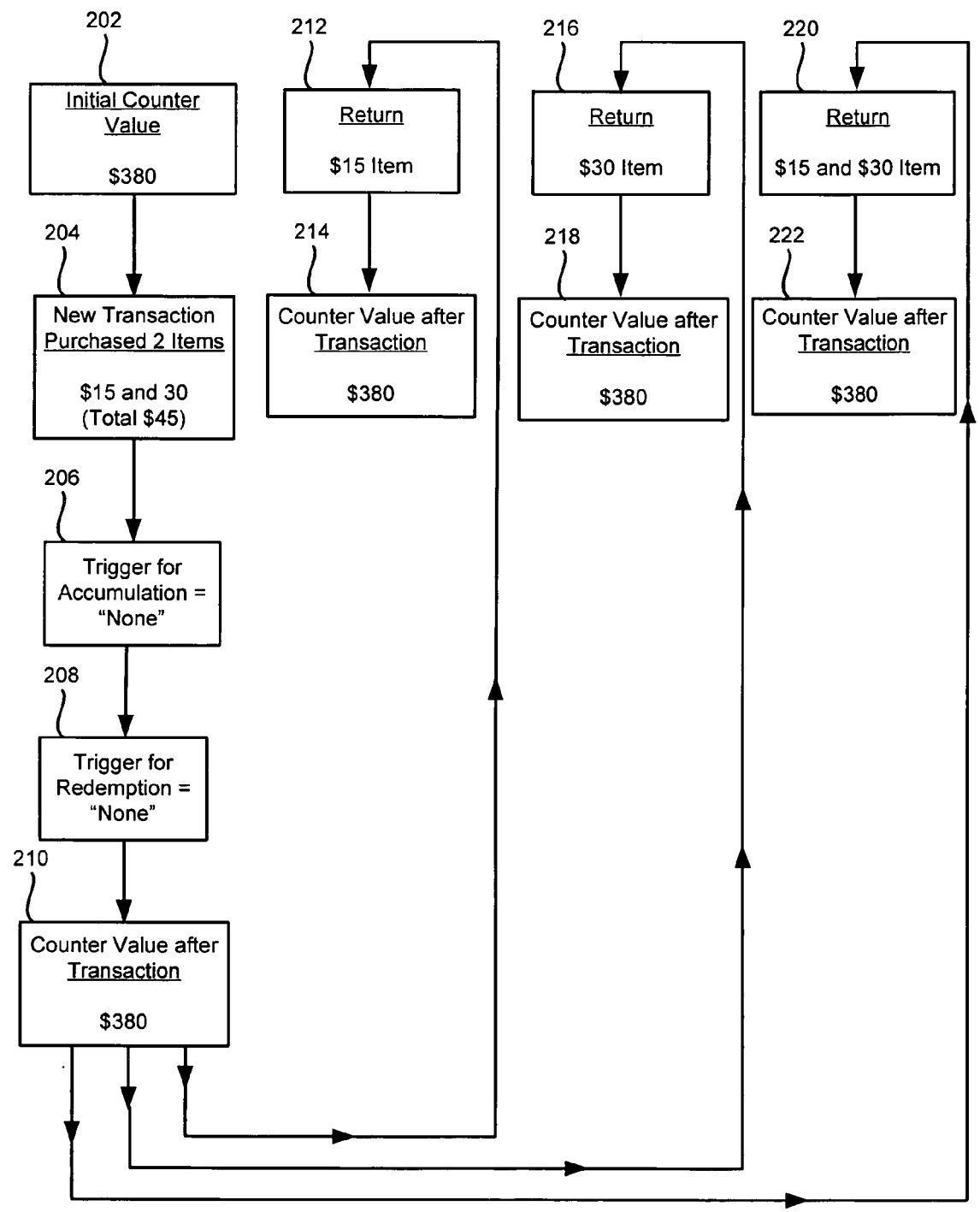
FIGS. 2-11 are simplified flow charts illustrating operations of exemplary embodiments of the present invention.
Figure 3:
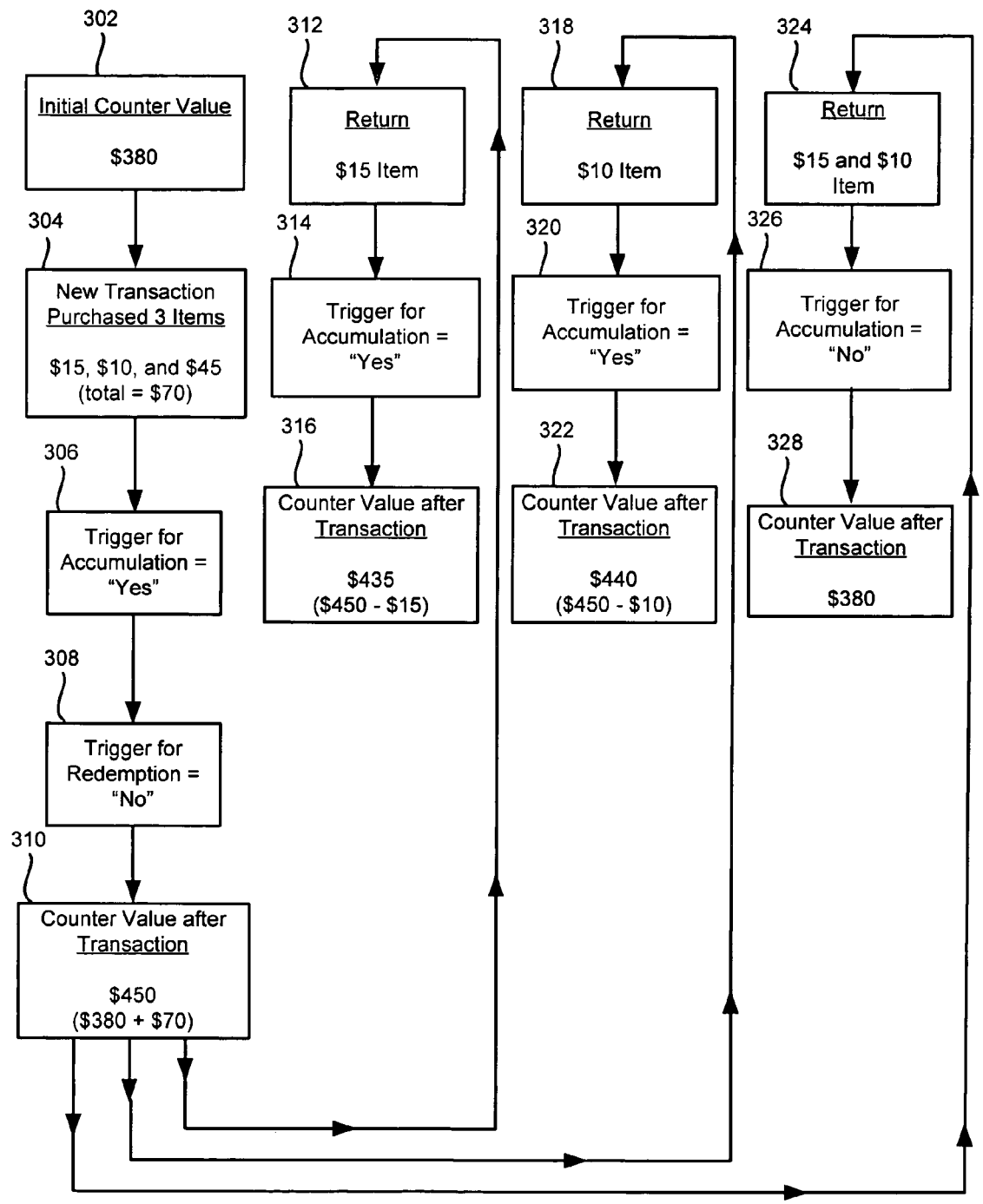
Figure 4:
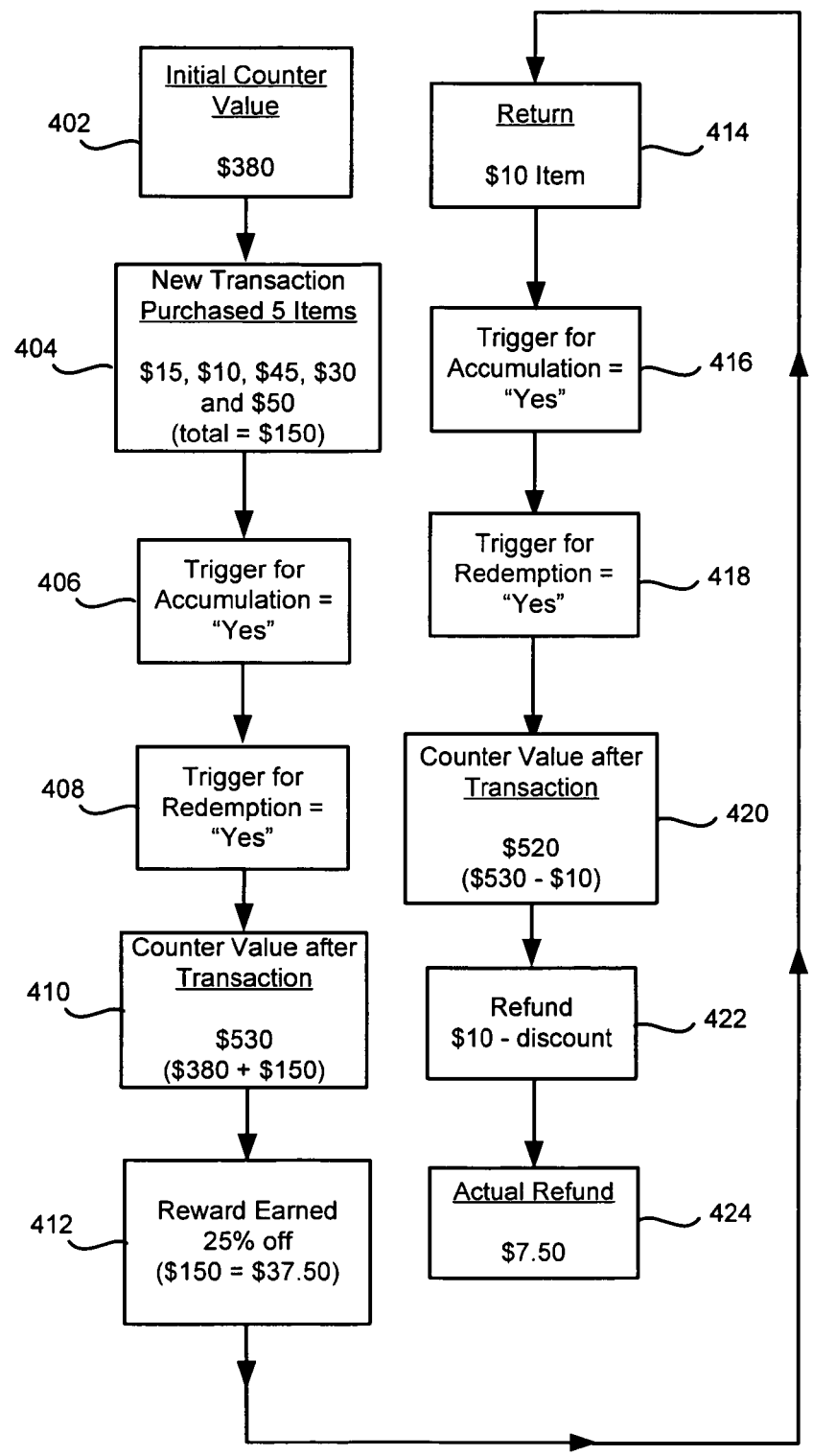

Turning to illustrative examples of exemplary operations of the present invention, FIGS. 2-4 illustrate simplified flowcharts of a reward reversal process under various illustrative situations. The rules of the loyalty program in FIGS. 2-4 include "triggers" defined by total purchase values that a transaction must exceed in order for the accumulation and redemption of rewards to occur. For example, the loyalty program of FIGS. 2-4 require a transaction total of $500, in $50 or more increments, to qualify for a reward of 25% off any transaction of $60 or more. Accordingly, the trigger to accumulate rewards is a purchase of $50 or more, the trigger to redeem a reward is a purchase of $60 or more, with a threshold total amount which qualifies for redemption at $500. FIGS. 2-4 also use a qualifying purchase count to record the value of stored rewards before and after transactions. The initial value of the purchase count (202, 302, 402) and the value of the purchase count after a transaction are displayed (210, 310, 410). The initial value of the purchase count (corresponding to stored rewards) for the examples in FIGS. 2-4 is assumed to be $380.

Referring to FIG. 2, a purchase and return scenario using the above logic with no accumulation or redemption is shown. The original transaction includes two items that cost $15 and $30 respectively, as shown in step 204. Since the total transaction value is less than the trigger for accumulation ($50), step 206 shows that no accumulation results. Likewise, since the total transaction value is less than the trigger to redeem ($60), step 208 shows that no redemption results. Consequently, in step 210 the purchase count after the transaction remains the same ($380).

The return transactions of FIG. 2 are illustrated in steps 212, 216, and 220. The return of the $15 item, the $30 item, or both $15 and $30 items results in a final purchase count of $380 after the return (214, 218, 222), since accumulation for the transaction prior to the return ($45) does not exceed the trigger for accumulation ($50).

FIG. 3 illustrates a situation with the same loyalty program of FIG. 2 but where accumulation is triggered. Step 304 depicts an original transaction of three items that cost $15, $10 and $45, respectively. Since the total transaction value ($70) exceeds the trigger for accumulation ($50) (306), the total transaction value is added to the purchase count resulting in a new purchase count ($450) (310). However, since the new purchase count ($450) does not exceed the threshold required for redemption ($500), no redemption is triggered (308).

Steps 312, 318 and 324 of FIG. 3 illustrate three return scenarios of a $15 item, a $10 item and both the $15 and $10 items, respectively. For each scenario, the total transaction value is examined to determine if the accumulation trigger is exceeded. In this case, the accumulation trigger ($50) is exceeded by the total transaction value ($70). For each scenario, the value of the returned item is then subtracted from the total transaction value and the difference is subsequently used to determine if the trigger for accumulation is exceeded. For the returns of the $15 item of step 312 and the $10 item of step 318, the difference between the values of the returned item and the total transaction value ($55 and $60, respectively) triggers accumulation. In other words, the two transactions still qualify for accumulation despite the returned items. The difference represents the new total transaction value less the value of the returned item. The difference reduced by the original total transaction value ($70) is added to the purchase count to obtain the new purchase count (316, 322). In this case, it should be noted that the difference reduced by the original total transaction value is a negative number.

The return of both $15 and $10 items, however, does not trigger accumulation because the total transaction value ($70) reduced by the value of the returned items ($35) does not exceed the accumulation trigger ($50). Therefore, the total value of the transaction ($70) is subtracted from "0" and the result is added to the purchase count (328). The final purchase count after the return is the same as the initial purchase count before the original transaction ($380). The consequence of these steps is that if the return of items from a prior transaction disqualifies that transaction from triggering the accumulation of rewards, the purchase count will accordingly be adjusted to reflect that the qualifying transaction has not taken place. The reversal of accumulation would prevent the fraudulent growth of rewards towards a redemption based on qualifying transactions that are subsequently returned.

FIG. 4 illustrates a situation with the above loyalty program as FIG. 2 and in which both accumulation and redemption are triggered. The original transaction includes five items that cost $15, $10, $45, $30 and $50, respectively, as shown in step 404. Since the total transaction value ($150) exceeds the accumulation trigger ($50), accumulation is triggered (406) and the total transaction value is added to the purchase count (410). Since the purchase count ($530) exceeds the threshold amount for redemption ($500), redemption is also triggered (408). The reward is redeemed in step 412, and 25% of the total transaction value of $150 is granted towards the transaction.

For the return transaction (414), a return of $10 triggers accumulation since the difference between the value of the returned item and the total transaction value ($140) exceeds the accumulation trigger ($50). This difference results in the reduction of the count value from $530 to $520, as shown in step 420. Since a reward was redeemed, the value of the refund for the item being returned is reduced in proportion to the amount rewarded (422, 424).

FIGS. 2-5 represent operations of exemplary embodiments of the present invention in which the purchase count, accumulation and redemption triggers are represented by total values of the purchase or return transactions. The total value of a transaction may be represented by the sum of all purchases for a transaction. The total value of a transaction may be also be represented by the sum of all purchases reduced by the sum of all returns for a return transaction. The control application for managing reward reversal may be configured in ways other than counting the total values of transactions, as shown in FIGS. 2-5. For example, in other exemplary embodiments, the purchase count, accumulation and redemption triggers are represented by the total number of products in a transaction, as will be further described below.

Figure 6:
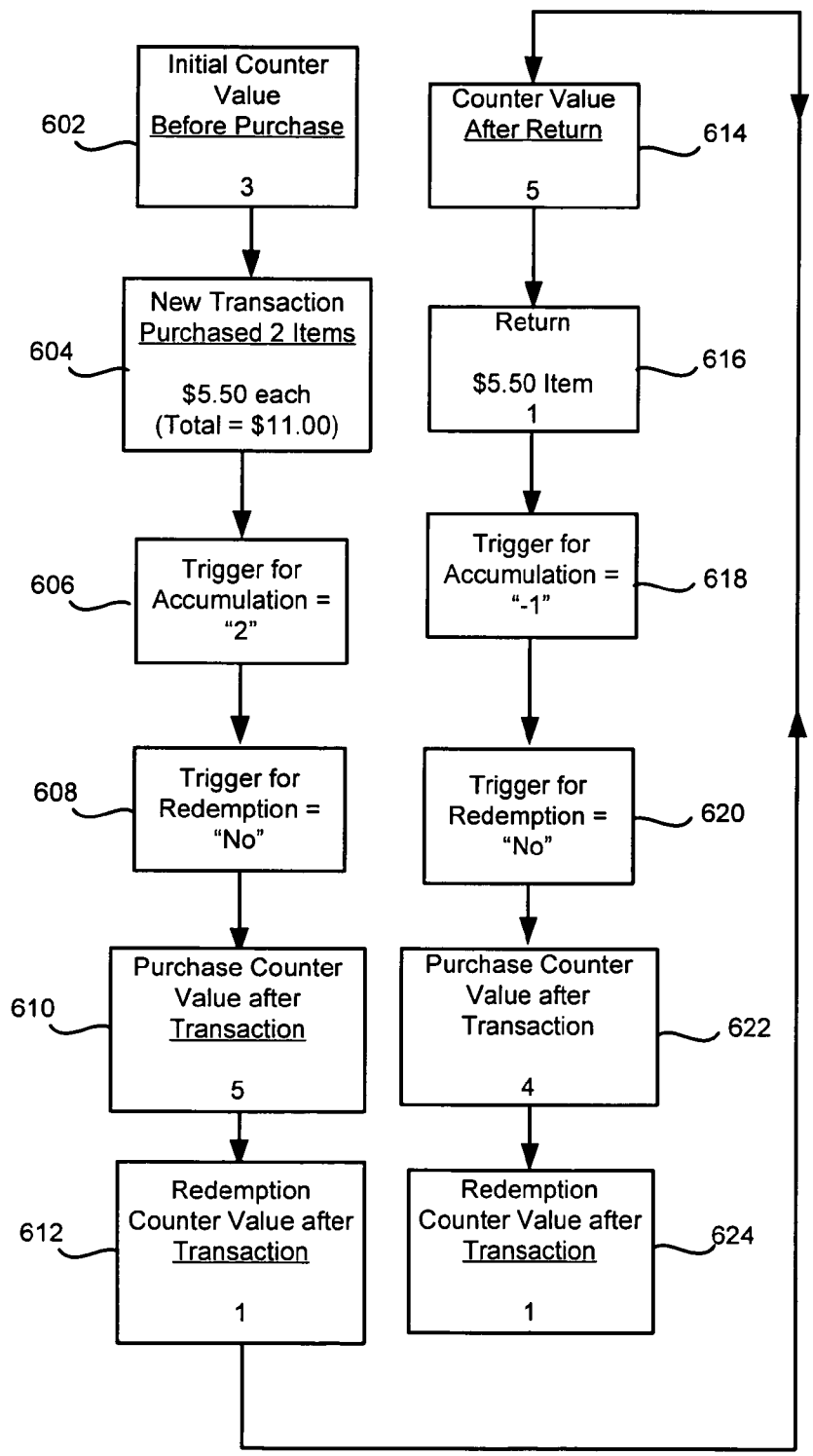

FIG. 6 illustrates a simplified flowchart for the reward reversal process of another exemplary embodiment. The purchase count in the embodiment of FIG. 6 maintains a continuous count of the number of qualifying products the consumer has purchased. The rules for the loyalty program require the purchase of six (6) qualifying products for a reward of 10% off a purchase. Thus, the redemption trigger is the purchase of six (6) qualifying products. The accumulation trigger is the purchase of one item of a qualifying product. In one implementation, the acceptance point device may detect whether or not a transaction involves qualifying products. The reward in the example of FIG. 6 is also immediate and limited to three (3) redemptions. The redemption count and the defined maximum limit of redemptions in some embodiments are generally written to the portable device 110. The portable device 110 may track the number of redemptions awarded to the holder of the device 110.

The initial conditions assumed for the embodiment of FIG. 6 is a redemption count of one (1) reward out of the maximum of three (3) possible, and the purchase of three (3) qualifying products. Accordingly, the purchase count is at three (3) in step 602 and the redemption count on the device 110 is at one (1) prior to any new transactions.

Step 604 in FIG. 6 shows a new purchase of two (2) items at $5.50 each. Assuming the two (2) items are qualifying products for accumulation, the step of 606 displays the number of purchases in the new transaction to be added to the purchase count. Since the total number of purchases (5) does not exceed the trigger for redemption (6), no redemption is triggered after the transaction (608) and the redemption count remains at 1 (612).

Upon return of one (1) item at $5.50 illustrated in step 616, the purchase count (5) is reduced by the number of qualifying goods being returned (1) and the new purchase count (4) is loaded onto to the device 110 (622). Since the purchase count (4) after the transaction does not exceed the number of qualifying purchases required for redemption (6), the redemption count remains the same (624).

Figure 7:
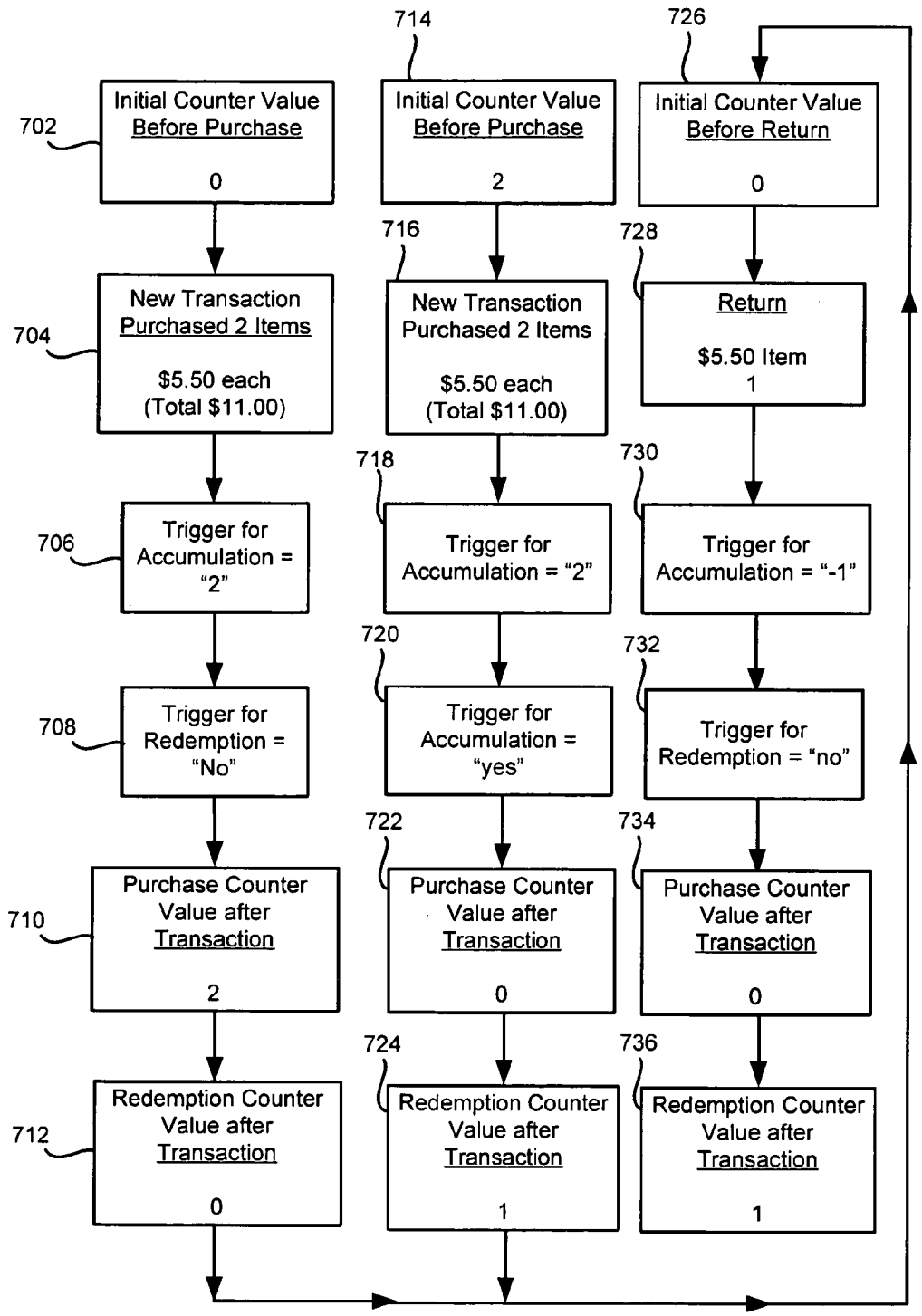

FIG. 7 illustrates a simplified flow chart of a reward reversal process for an embodiment with a loyalty program that requires the purchase of three (3) qualifying products to receive a reward of 10% off. As in FIG. 6, the purchase count in FIG. 7 maintains a count of the number of qualifying products for accumulation. Moreover, like the rewards for the loyalty program shown in FIG. 6, the rewards shown in FIG. 7 are limited to three (3) redemptions and redeemed rewards are written to the device 110 to track the number of redemptions. The redemption limits may also be written to the device 110 or communicated to the device 110 by an acceptance point device 108.

Steps 702-712 illustrate a purchase of two (2) qualifying products at $5.50 each. Step 714 thus displays a purchase count of two (2), before the purchase of two more items at $5.50 each in step 716. Because the total number of qualifying products purchased (4) after the two (2) transactions exceeds the threshold required for redemption (3), redemption is triggered and a 10% reward of the purchase at step 716 is awarded to the customer (720). In step 722, the purchase count after the transaction is reset to zero (0), since the reward was redeemed in the previous step 720. The resetting of the purchase count in the present embodiment to zero (0) after redemption prevents the growth of rewards after they have been redeemed and thus prevents unfair benefit to the holder of the device 110.

The return transaction in the present embodiment shows the return of one (1) item in step 728. The return transaction in FIG. 7 differs from the return transaction illustrated in FIG. 6 because the initial purchase count in FIG. 7 is at zero (0) (726) and will thus be reduced to a negative value with the return of one (1) item. If the purchase count after the return of one or more items is a positive value, as in step 616, the reward reversal process follows the return transaction illustrated in FIG. 6. However, if the purchase count reduces to a negative value, the process follows the return transactions illustrated in FIGS. 7 and 8, as will be further described below.

As in the embodiment of FIG. 6, the embodiment of FIG. 7 reverses the accumulation level and loads the new purchase count to the device 110 by reducing the purchase count (0) by the number of qualifying products being returned which in this case is one (1). In the present embodiment, the purchase count is reset to zero (0) in step 734. The reward redemption count is reduced if the remaining items from the original transaction does not qualify for the reward. In FIG. 7, however, the reward redemption count remains the same (736) since the reward still applies to the three (3) remaining items of the original transaction, and the purchase count is reset to zero (0) (734).

Figure 8:
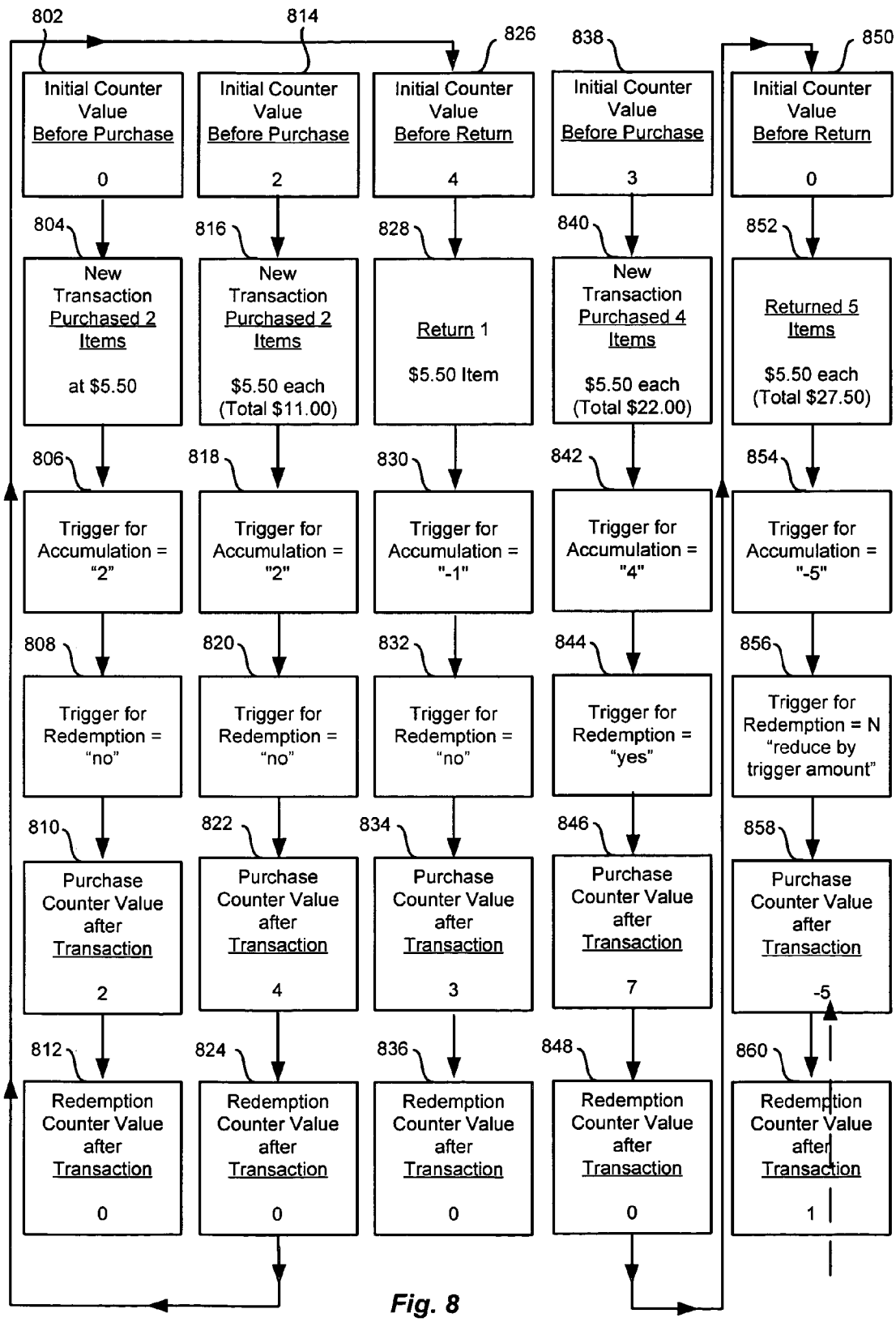

Referring to FIG. 8, a simplified flowchart for an embodiment similar to the embodiment of FIG. 7 is shown where the purchase count after the return of products reduces to a negative value, but where the items remaining in the transaction prior to the return does not qualify for a reward. In the event that the return of qualifying products disqualifies the transaction from a reward, an "escrow" account is utilized. The escrow account is cleared prior to earning a new reward.

The rules for the loyalty program of FIG. 8 require a purchase of six (6) items of product X to receive a reward of 10% off a purchase of product X. The redemption trigger is thus six (6). The transaction history in the example of FIG. 8 is as follows. A first purchase of two (2) items at $5.50 each (804) and a second purchase of two (2) items at $5.50 each (816) result in a purchase count of four (4) (822). The return of one (1) item at $5.50 (828) reduces the purchase count to three (3) (834). A third purchase of four (4) items at $5.50 each (840) increases the purchase count to seven (7) (846). Since the purchase count after the third purchase exceeds the threshold value for redemption (6), redemption is triggered (844) and the redemption count is accordingly set to one (0) (848). The purchase count is then reset to zero (0) after a reward has been redeemed (850).

The subsequent return of five (5) items at $5.50 each (852) results in a negative purchase count (−5) (858) after the return transaction. The negative purchase count in the present embodiment represents an escrow account. In some embodiments, the purchase count is automatically reset to zero (0) when the number of items being returned is greater than the initial purchase count, and a separate escrow account with a negative value is simultaneously created. The reward is not returned and the redemption count remains at its current count. However, the customer must clear the escrow account before earning a new reward and thus does not unfairly benefit from retaining the reward. An escrow account is also useful in preventing a customer from losing accumulated rewards during the return of purchased products, by facilitating the use of one count to continuously maintain the current purchase count while clearing the balance for return transactions by the use of a separate count.

Figure 9:
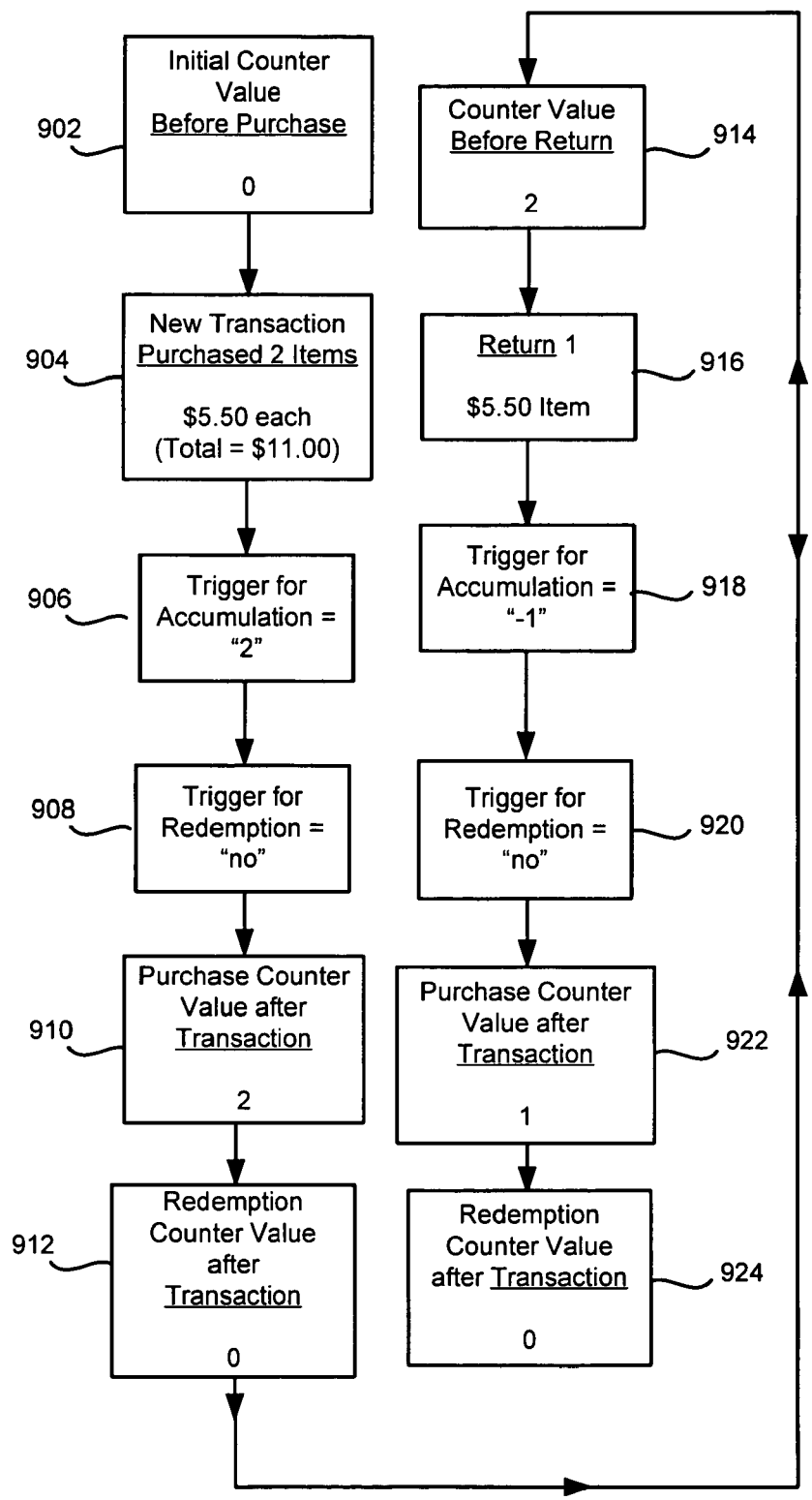
Figure 10:
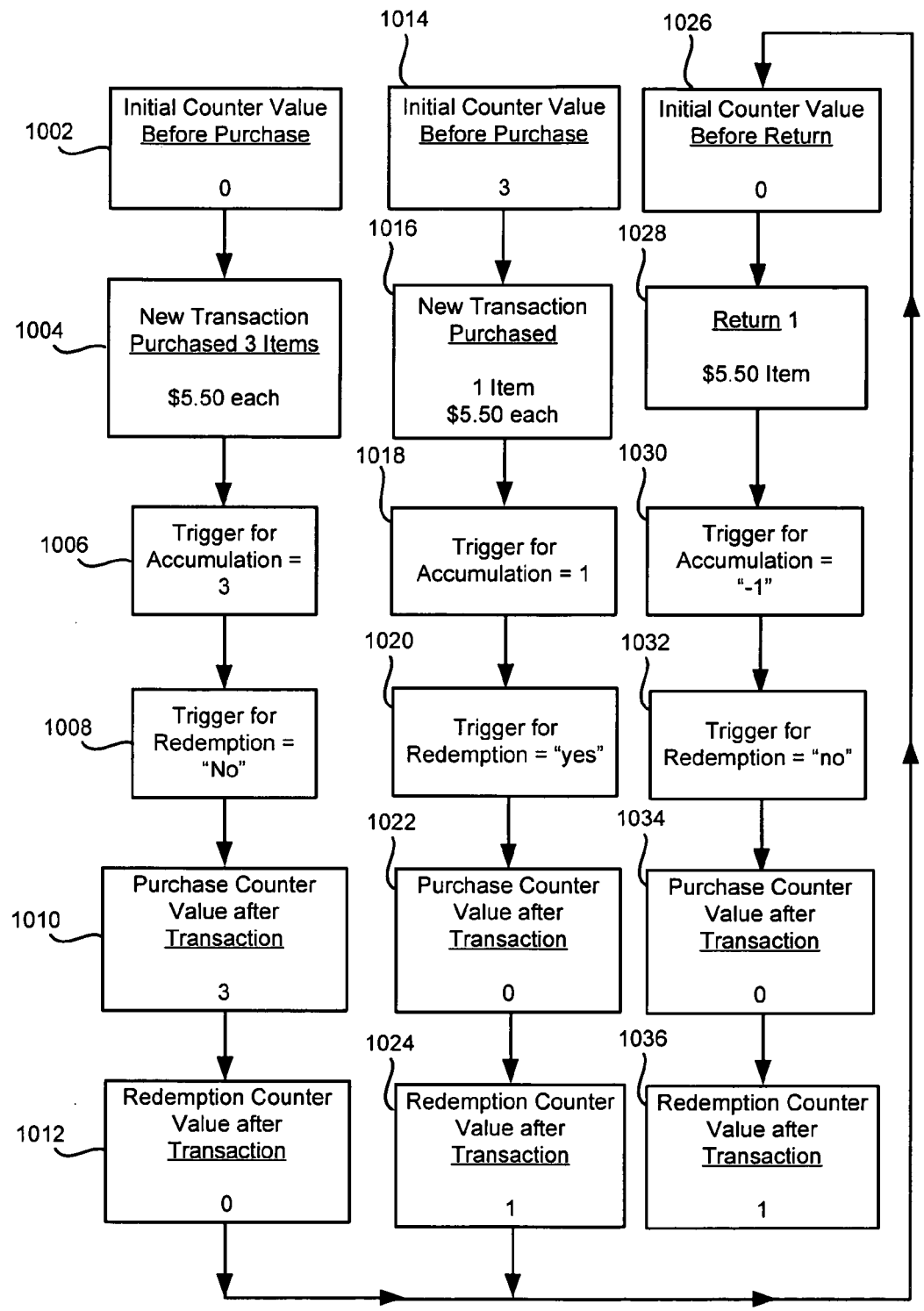

FIGS. 9-10 illustrate simplified flowcharts of the reward reversal process for embodiments of the present invention with a loyalty program that grants a reward that is delayed instead of immediately applied to a transaction. For example, the loyalty program rules associated with FIG. 9 require the purchase of two (2) items of product X for $10 or more for a reward of 10% off the next purchase of product X. The redemption trigger is thus two (2) in addition to a subsequent purchase transaction of any number of product X.

Referring to FIG. 9, the purchase transaction of two (2) items of X at $5.50 results in an accumulation and purchase count of two (2) (906, 910). Although the required number of qualifying purchases has been met, redemption is not yet triggered since redemption of the reward is delayed until the next purchase (908, 912). Instead, an electronic "coupon" for a future redemption of the 10% reward becomes available and is stored on the device 110 to be redeemed for the next purchase of product X.

The return transaction of step 916 shows the return of one item at $5.50, which results in a reduction of the accumulation by one (1) (918) and a reduction of the purchase count from two (2) to one (1) after the return (922). When a coupon representing delayed redemption is available and a qualifying product is returned, the purchase count is represented by the subtraction of the number of products being returned from the redemption trigger, which is the same value as the purchase count prior to the return. The coupon also becomes unavailable and is removed from the device 110 soon after the purchase count is updated to fall below the required value (922). The removal of the coupon requires the customer to earn the coupon again by making the required number of qualifying purchases.

Referring to FIG. 10, the rules governing the delayed reward in another embodiment require the purchase of three (3) qualifying products to receive a reward of 10% off the next purchase. The redemption trigger is thus three (3) qualifying products in addition to any number of products in a subsequent purchase. In step 1004, the purchase of three (3) items at $5.50 results in a purchase count of three (3) and the loading of a reward in the form of a "coupon" to the device 110 to be redeemed during a subsequent purchase (1010). With the purchase of another item at $5.50, redemption of the reward is triggered, 10% off the purchase of the subsequent purchase item is granted, and the redemption count is increased to a value of one (1) (1016, 1020, 1024). The purchase count is reset to zero (0) after the reward is redeemed (1022).

The return of the item purchased with the redeemed reward in step 1028 causes the purchase count, which has an initial value of zero (0), to assume a negative value. If the return transaction causes the purchase count to become a negative value and the redemption count is greater than zero (0), the reward is restored in the form of a "coupon" which is available for subsequent redemption. One consequence of this step is that the customer does not lose the redeemed reward or rewards accumulated by prior qualifying purchases when making a return. By comparison, other forms of rewards such as a paper-based coupons typically would not be allowed to be reused after a return transaction. Paper-based coupons and the like generally expire after they are redeemed once.

In addition, other embodiments of the present invention may also be implemented to apply an expiration date. Rules relating to expiration may be stored in the host 104 and communicated to the acceptance point device. For example, expiration dates may be applied by the merchant or retailer to the accumulation of rewards or to the redemption of rewards. Similarly, reinstatement of a previously redeemed reward may be subject to an expiration date after which the previously redeemed reward can no longer be reinstated.

Figure 11:
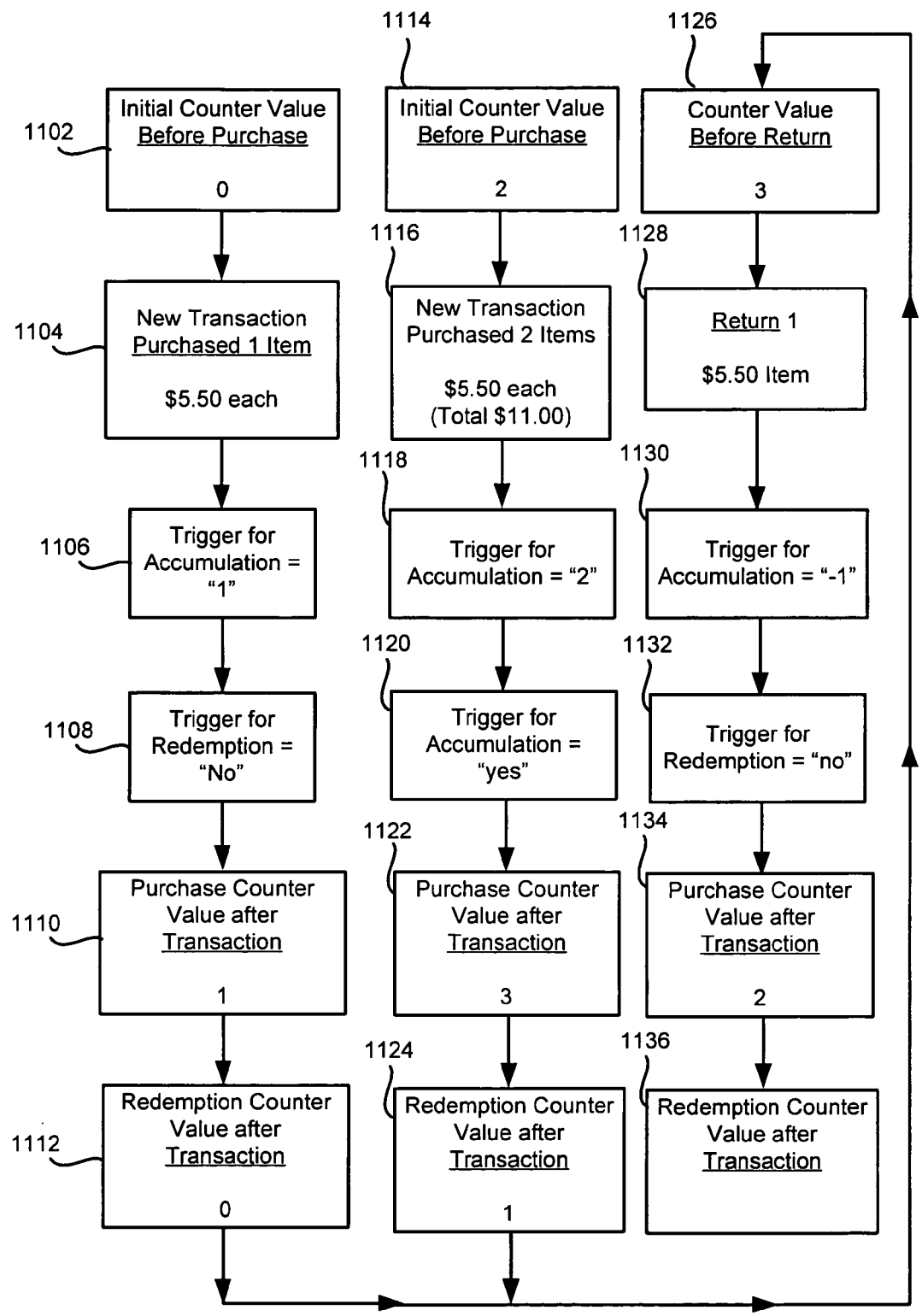

FIG. 11 illustrates a simplified flowchart of a reward reversal process that contains such an expiration feature. The example of FIG. 11 illustrates the situation where an expiration date for the redemption of a reward is applied. The rules of the loyalty program require the purchase of two (2) items of product X to receive a reward of 10% off the purchase of product X. A first purchase of one (1) item at $5.50 does not trigger redemption (1104, 1108). A second purchase of two (2) more items at $5.50 each triggers redemption, since the requirement of a purchase of two (2) qualifying products for redemption is met (1116, 1120). The reward is redeemed after the second purchase transaction and the purchase count is incremented to three (3) (1122).

Step 1128 illustrates the return of one (1) item at $5.50. Step 1136 displays no value or expression because the redemption date for the reward has expired. Consequently, the customer could not apply the two (2) qualifying products accumulated in the purchase count after the return, illustrated in step 1134, towards the redemption of a reward for a subsequent purchase. In other embodiments, an option can be added to override the expiration of the redemption date so as to allow redemption of the reward. The availability of such an option would depend on the individual rules established for each loyalty program.

While the present invention has been illustrated using the particular combinations of reward program rules and reversal processes as described, it should be recognized that other combinations are within the scope of the invention. For example, in an alternative embodiment, the present invention is capable of handling reward reversals for an account linked to multiple loyalty programs.

The present invention may also be implemented in different combinations of hardware and software than the ones described. Based on the disclosure and teachings provided herein, a person of ordinary skill in the art will know of other ways and/or methods to implement the present invention.

It should be understood that the embodiments provided are illustrative and not restrictive. Various other modifications are possible within the scope of the invention claimed. Moreover, while the description of the different embodiments are provided in the context of a loyalty program, a person of ordinary skill in the art would appreciate how to utilize the present invention in other applications or context where the reversal of product-based incentives may be desirable.

What is claimed is:

1. A system for managing reward reversals in connection with a loyalty program, comprising:
    a computer comprising
        control logic configured to receive information relating to a previously completed transaction that is to be reversed including a total value being returned and a total value of the previously completed transaction, the previously completed transaction being associated with an account linked to the loyalty program governed by one or more rules including an expiration limit on when the previously completed transaction can be reversed and an override of the expiration limit, wherein the total value being returned is less than the total value of the previously completed transaction,
        control logic configured to determine reversal information for the transaction to be reversed, wherein the reversal information determination includes
            determining that the total value of the previously completed transaction had earned an accumulated reward,
            determining a new total transaction value to account for the total value being returned, and
            determining if the new total transaction value earns any accumulated reward,
        control logic configured to use the reversal information to back out the accumulated reward earned for the previously completed transaction,
        control logic configured to restore any reward that was redeemed as part of the previously completed transaction,
        control logic configured use the reversal information to add any accumulated reward for the new total transaction value to the account,
        control logic configured to determine whether the account has a negative reward value,
        control logic configured to create an escrow account upon the reversal of the previously completed transaction, the escrow account having the negative reward value,
        control logic configured to clear the escrow account upon one or more transactions completed after the reversal, and
        control logic configured to use the reversal information to reverse the previously completed transaction and update the account.

2. The system of claim 1 further comprising control logic configured to determine whether the previously completed transaction that is to be reversed is eligible for reversal.

3. The system of claim 2 wherein the previously completed transaction was conducted with a portable device; and
    wherein the determination as to whether the previously completed transaction is eligible for reversal is made based on whether the portable device is presented for reversing the previously completed transaction.

4. The system of claim 3 wherein the wherein the portable device comprises an EEPROM.

5. The system of claim 1 further comprising control logic configured to determine whether the previously completed transaction that is to be reversed is eligible for reversal, wherein the determination as to whether the previously completed transaction is eligible for reversal is made based on the one or more rules governing the loyalty program.

6. The system of claim 5 wherein the one or more rules governing the loyalty program includes a limit on number of times transactions can be reversed under the account.

7. The system of claim 5 wherein the one or more rules governing the loyalty program includes a policy provided by a sponsor of the loyalty program.

8. The system of claim 1 wherein the control logic configured to use the reversal information to reverse the previously completed transaction and update the account includes:
    control logic configured to update a reversal activity log after the previously completed transaction has been reversed.

9. The system of claim 1 wherein the computer is a point-of-sale device.

10. The system of claim 1, wherein the control logic configured to use the reversal information to reverse the previously completed transaction and update the account comprises:

control logic configured to determine a refund for the reversed transaction and store the history of the reversed transaction.

11. The system of claim 1, wherein the computer is configured to operate offline.

12. The system of claim 11, wherein the computer further comprises control logic configured use to the reversal information to restore any reward that was redeemed as part of the previously completed transaction.

13. The system of claim 1, further comprising control logic configured to record a purchase count, the purchase count corresponding to the value of stored rewards before and after the previously completed transaction.

14. A method for managing reward reversals in connection with a loyalty program governed by one or more rules, comprising:
receiving information at a computer relating to a previously completed transaction that is to be reversed including a total value being returned and a total value of the previously completed transaction, the previously completed transaction being associated with an account linked to the loyalty program, wherein the total value being returned is less than the total value of the previously completed transaction, and wherein the one or more rules governing the loyalty program include an expiration limit on when the previously completed transaction can be reversed and an override of the expiration limit;
using the computer to determine reversal information for the transaction to be reversed, wherein the reversal information determination includes
determining that the total value of the transaction had earned an accumulated reward,
determining a new total transaction value to account for the total value being returned, and
determining if the new total transaction value earns any accumulated reward;
using the reversal information and the computer to back out the accumulated reward earned for the previously completed transaction;
restoring any reward that was redeemed as part of the previously completed transaction;
using the reversal information and the computer to add any accumulated reward for the new total transaction value to the account;
determining whether the account has a negative reward value;
creating an escrow account upon the reversal of the previously completed transaction, the escrow account having the negative reward value;
clearing the escrow account upon one or more transactions completed after the reversal; and
using the reversal information and the computer to reverse the previously completed transaction and update the account.

15. The method of claim 14 further comprising:
using the computer to determine whether the previously completed transaction that is to be reversed is eligible for reversal.

16. The method of claim 15 wherein the determination as to whether the previously completed transaction is eligible for reversal is made based on the one or more rules governing the loyalty program.

17. The method of claim 16,
wherein the one or more rules governing the loyalty program includes a limit on number of times transactions can be reversed under the account.

18. The method of claim 16 wherein the one or more rules governing the loyalty program includes a policy provided by a sponsor of the loyalty program.

19. The method of claim 15 wherein the previously completed transaction was conducted with a portable device; and
wherein the determination as to whether the previously completed transaction is eligible for reversal is made based on whether the portable device is presented for reversing the previously completed transaction.

20. The method of claim 19 wherein the portable device includes a redemption level and an accumulation level.

21. The method of claim 19 wherein the portable device is wirelessly connected to the computer.

22. The method of claim 14 wherein using the reversal information and the computer to reverse the previously completed transaction and update the account includes:
updating a reversal activity log after the previously completed transaction has been reversed.

23. The method of claim 14, wherein the one or more rules comprises a requirement of a purchase of six qualifying products for a reward of ten percent off a purchase.

24. The method of claim 14, further comprising the use of one count to continuously maintain the current purchase count while clearing the balance for return transactions by the use of a separate count.

25. The method of claim 14, further comprising using the computer to record a purchase count, the purchase count corresponding to the value of stored rewards before and after the previously completed transaction.

26. A point-of-sale device configured to use a method for managing reward reversals in connection with a loyalty program governed by one or more rules, the method comprising:
receiving information at a computer relating to a previously completed transaction that is to be reversed including a total value being returned and a total value of the previously completed transaction, the previously completed transaction being associated with an account linked to the loyalty program, wherein the total value being returned is less than the total value of the previously completed transaction, and wherein the one or more rules governing the loyalty program include an expiration limit on when the previously completed transaction can be reversed and an override of the expiration limit;
using the computer to determine reversal information for the transaction to be reversed, wherein the reversal information determination includes
determining that the total value of the transaction had accumulated rewards,
determining a new total transaction value to account for the total value being returned, and
determining if the new total transaction value earns any accumulated reward;
using the reversal information and the computer to back out the accumulated reward earned for the previously completed transaction;
using the reversal information and the computer to restore any reward that was redeemed as part of the previously completed transaction;
using the reversal information and the computer to add any accumulated reward for the new total transaction value to the account;
determining whether the account has a negative reward value;

using the reversal information and the computer to create an escrow account upon the reversal of the previously completed transaction, the escrow account having the negative reward value, using the computer to clear the escrow account upon one or more transactions completed after the reversal; and using the reversal information and the computer to reverse the previously completed transaction and update the account.

27. The method of claim 14, wherein a coupon has been provided to a portable device associated with the account, wherein the coupon is configured to be redeemed during a subsequent transaction, the method further comprising:

removing the coupon from the portable device.

28. The point of sale device configured to use a method of claim 26, wherein the method further comprises using the reversal information and the computer to restore any reward that was redeemed as part of the previously completed transaction.

29. The point-of-sale device of claim 26, wherein the point-of-sale device is configured to operate offline, such that information is periodically transmitted from the point-of-sale device to a host through a communication medium.

30. The point of sale device of claim 26, wherein the account includes a purchase count to record the value of stored rewards before and after the previously completed transaction.

* * * * *